(12) United States Patent
Mankowski et al.

(10) Patent No.: US 12,337,463 B2
(45) Date of Patent: Jun. 24, 2025

(54) ROBOT SWARM

(71) Applicant: ACCELERATED SYSTEMS INC., Waterloo (CA)

(72) Inventors: Peter Mankowski, Waterloo (CA); Willem Jager, Cambridge (CA); Tim Lambert, Los Angeles, CA (US)

(*) Notice: Subject to any disclaimer, the term of this patent is extended or adjusted under 35 U.S.C. 154(b) by 399 days.

(21) Appl. No.: 18/110,762

(22) Filed: Feb. 16, 2023

(65) Prior Publication Data

US 2023/0264364 A1     Aug. 24, 2023

Related U.S. Application Data

(60) Provisional application No. 63/311,970, filed on Feb. 19, 2022.

(51) Int. Cl.
*G05D 1/00* (2024.01)
*B25J 13/00* (2006.01)

(52) U.S. Cl.
CPC ........... *B25J 13/003* (2013.01); *B25J 13/006* (2013.01); *G05D 1/0022* (2013.01)

(58) Field of Classification Search
CPC ..... B25J 13/003; B25J 13/006; G05D 1/0022; G05D 1/0291
See application file for complete search history.

(56) References Cited

U.S. PATENT DOCUMENTS

| | | | | |
|---|---|---|---|---|
| 7,844,364 B2* | 11/2010 | McLurkin | .............. | G06N 3/008 700/245 |
| 10,537,996 B2* | 1/2020 | Egerstedt | ............. | G05D 1/0027 |
| 10,694,529 B2* | 6/2020 | MacCready | .......... | H04W 8/005 |
| 2020/0036609 A1* | 1/2020 | Nocon | ................... | B25J 13/006 |

* cited by examiner

*Primary Examiner* — Harry Y Oh

(57) ABSTRACT

There are provided robot swarms and methods of operating thereof. Such a swarm may include two or more robots each having a microphone, a speaker, and a communication terminal for sending or receiving an electromagnetic signal to or from a communication partner to affect electromagnetic communication with the communication partner. Upon detection of a disruption to the electromagnetic communication, a given robot of the two or more robots may switch from electromagnetic communication to acoustic communication by exchanging an acoustic signal between one of the speaker and the microphone of the given robot and one of a corresponding microphone and a corresponding speaker of a corresponding communication partner.

25 Claims, 4 Drawing Sheets

ROBOT SWARM

CROSS-REFERENCE TO RELATED APPLICATION

This application claims the benefit of, and priority from, U.S. Provisional Patent Application No. 63/311,970, filed on Feb. 19, 2022, which is incorporated herein by reference in its entirety.

FIELD

This specification is related to robots, and in particular to robot swarms and methods of operating thereof.

BACKGROUND

Machines or devices may be used to perform useful tasks. Examples of such machines or devices may include robots. Two or more robots may cooperate to perform tasks that are more suited to being performed by a group of robots.

SUMMARY

According to an aspect of the present specification there is provided a robot swarm comprising: two or more robots, each robot comprising: three or more microphones; a speaker; and a communication terminal for one or more of sending and receiving an electromagnetic signal to or from a communication partner to affect electromagnetic communication with the communication partner; upon detection of a disruption to the electromagnetic communication, a given robot of the two or more robots to switch from electromagnetic communication to acoustic communication by exchanging an acoustic signal between one of the speaker and at least one of the microphones of the given robot and one of a corresponding microphone and a corresponding speaker of a corresponding communication partner.

One or more of: the communication partner may comprise one or more of: a robot of the two or more robots and a communication hub; and the corresponding communication partner may comprise one or more of: a corresponding robot of the two or more robots and the communication hub.

The communication hub may be fixed in space.

The communication hub may be mobile.

The communication hub may comprise one of the two or more robots.

The electromagnetic signal may comprise a wireless signal.

The acoustic signal may have a frequency range outside the upper frequency of the audible range of one or more of humans and animals.

The frequency range of the acoustic signal may be over about 15 kHz.

According to another aspect of the present specification there is provided a robot swarm comprising: three or more robots, each robot comprising: a microphone; a speaker; and a communication terminal for one or more of sending and receiving an electromagnetic signal to or from a communication partner to affect electromagnetic communication with the communication partner; upon detection of a disruption to the electromagnetic communication, a given robot of the three or more robots to switch from electromagnetic communication to acoustic communication by exchanging an acoustic signal between one of the speaker and the microphone of the given robot and one of a corresponding microphone and a corresponding speaker of a corresponding communication partner.

One or more of: the communication partner may comprise one or more of: a robot of the three or more robots and a communication hub; and the corresponding communication partner may comprise one or more of: a corresponding robot of the two or more robots and the communication hub.

The communication hub may be fixed in space.

The communication hub may be mobile.

The communication hub may comprise one of the two or more robots.

The electromagnetic signal may comprise a wireless signal.

The acoustic signal may have a frequency range outside the upper frequency of the audible range of one or more of humans and animals.

The frequency range of the acoustic signal may be over about 15 kHz.

According to yet another aspect of the present specification there is provided a method of operating a robot swarm, the method comprising: affecting electromagnetic communication between a first robot of the robot swarm and a communication partner, the robot swarm comprising a plurality of robots each comprising a communication terminal for one or more of sending and receiving an electromagnetic signal, a speaker, and a microphone, the affecting the electromagnetic communication comprising exchanging a corresponding electromagnetic signal between the first robot and the communication partner; detecting a disruption to the electromagnetic communication; and in response to the detecting the disruption to the electromagnetic communication, switching from the electromagnetic communication to acoustic communication to affect the acoustic communication between a given robot of the robot swarm and a corresponding communication partner, the affecting the acoustic communication comprising exchanging an acoustic signal between one of the speaker and the microphone of the given robot and one of a corresponding microphone and a corresponding speaker of the corresponding communication partner.

One or more of: the exchanging the corresponding electromagnetic signal between the first robot and the communication partner may comprise exchanging the corresponding electromagnetic signal between the first robot and the communication partner comprising one or more of a second robot of the robot swarm and a communication bub; and the exchanging the acoustic signal between one of the speaker and the microphone of the given robot and one of the corresponding microphone and the corresponding speaker of the corresponding communication partner may comprise exchanging the acoustic signal between one of the speaker and the microphone of the given robot and one of the corresponding microphone and the corresponding speaker of the corresponding communication partner comprising one or more of another robot of the robot swarm and the communication hub.

The exchanging the corresponding electromagnetic signal between the first robot and the communication partner may comprise exchanging a wireless electromagnetic signal between the first robot and the communication partner.

The method may further comprise: designating a target robot of the plurality of robots as a designated robot by associating a token with the target robot, the token comprising a digital data structure.

The token may comprise a token ID and an indication of a current owner of the token to associate the token with the designated robot.

The token may further comprise one or more of: an indication of time span, a random seed, a skill ID, a Skill ID weight, one or more hidden directories, one or more public messages, one or more private messages, and a custom field.

The method may further comprise: at least partially randomizing one or more functions of the designated robot based on the random seed.

The method may further comprise: changing the designated robot by wirelessly communicating the token from the designated robot to another robot of the robot swarm.

The designating the target robot of the plurality of robots as the designated robot may comprise determining the one of the plurality of robots based on a situation in which the robot swarm is to operate.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

Figure 1:
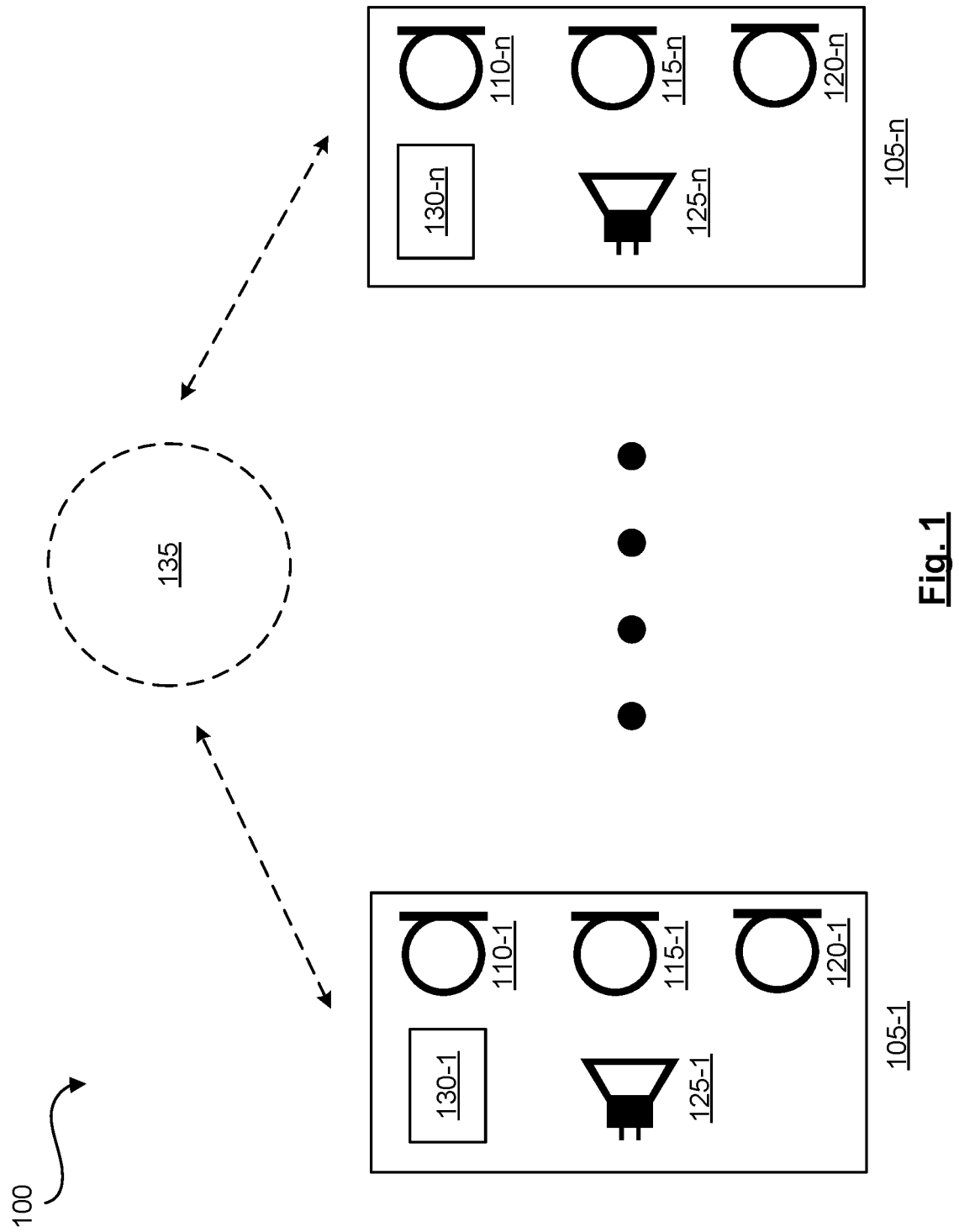
FIG. 1 shows a schematic representation of an example robot swarm, in accordance with a non-limiting implementation of the present specification.

In the following description, certain specific details are set forth in order to provide a thorough understanding of various disclosed implementations. However, one skilled in the relevant art will recognize that implementations may be practiced without one or more of these specific details, or with other methods, components, materials, and the like.

Moreover, in the following description, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

Unless the context requires otherwise, throughout the description which follows, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Robot swarms may be used to perform a variety of functions such as security and surveillance, emergency response, support services, and the like. In some examples, some or all of the robots in a swarm may be adaptive or retrainable, so that they may perform different functions. For example, robots that perform office mail delivery and maintenance during business hours may switch to performing office surveillance and security outside of business hours.

In this context, robot may refer to a device or machine that is capable of moving in its environment and interacting with that environment. In some examples, moving may comprise the robot's ability to change its position or location in, or relative to, its environment. Such robots may operate in environments such as on land, underground, in the air, on the water, underwater, or a combination thereof. In some examples, the robots may also operate beyond earth's atmosphere or in space. The robots' interacting with their environment may comprise sensing information about their environment, moving in their environment, projecting or making available information in their environment, or physically manipulating or being manipulated by their environment, and the like.

In order to act as a swarm, there may be coordination between some or all of the robots within the swarm. In order to achieve such coordination, the robots may communicate with one another, with one or more communication hubs, or with both. The robots may use electromagnetic signals to wirelessly communicate with one another. In some situations, such electromagnetic communications may be disrupted. In some examples, such disruptions may be due to malfunctions. Moreover, in some examples, such disruptions may be due to jamming of electromagnetic communications. In some situations, the jamming may be intentional. Disruptions in the electromagnetic communications of robots in a swarm may undermine the ability of those robots to function both individually and collectively as a swarm.

FIG. 1 shows a schematic representation of an example robot swarm 100. Swarm 100 comprises a plurality of robots 105-1 to 105-$n$. n may be a natural number greater than or equal to two. These robots may be generically or collectively referred to as robots 105. To address situations when their electromagnetic communications are disrupted, robots 105 may be able to switch to acoustic communications as an alternate or backup communication mode.

Robot 105-1 comprises three microphones 110-1, 115-1, and 120-1. Robot 105-1 also comprises a speaker 125-1 and a communication terminal 130-1 for one or more of sending and receiving electromagnetic signals. Similarly, robot 105-$n$ comprises three microphones 110-$n$, 115-$n$, and 120-$n$. Robot 105-$n$ also comprises a speaker 125-$n$ and a communication terminal 130-$n$ for one or more of sending and receiving electromagnetic signals. The microphones may be generically or collectively referred to as microphones 110, 115, and 120. Similarly, the speakers and the communication terminals may be generically or collectively referred to as speakers 125 and communication terminals 130.

Robots 105 may be able to communicate with one another using electromagnetic signals via their communication terminals 130. In some examples, robots 105 may also be able to communicate with a communication hub 135 using electromagnetic signals. In some examples, hub 135 may comprise a fixed communication hub such as a control unit, a communication antenna, and the like. In other words, a fixed communication hub may comprise a communication hub that is fixed is space and not mobile in ordinary operation. Moreover, in some examples, hub 135 may be a mobile or movable unit. For example, one or more of robots 105 may be designated to act as communication hubs. In FIG. 1 hub 135 is shown in dashed lines to indicate that in some examples robots need not communicate with a communication hub; such robots may be able to function together as a swarm by communicating with one another.

If the electromagnetic communications among robots 105 or with hub 135 are disrupted, robots 105 may switch to acoustic communications. A given robot 105 may use its speaker 125 to send acoustic signals to one or more other robots or to hub 135. In addition, a given robot 105 may use one or more of its microphones 110, 115, and 120 to receive acoustic signals from one or more other robots or from hub 135.

Having three microphones 110, 115, and 120 may allow each robot 105 to spatially triangulate the location of the source of a given acoustic signal relative to the location of robot 105. To facilitate this spatial triangulation, microphones 110, 115, and 120 may be spaced apart from one another in or on robot 105. Increasing the spatial separation between microphones 110, 115, and 120 may enhance the accuracy of spatial triangulation of the location of the source of an incoming acoustic signal.

The ability to spatially triangulate incoming acoustic signals (i.e. incoming sound) may allow a robot to locate the other robots in the swarm relative to itself. The same triangulation ability may allow a robot to locate a communication bub relative to itself, in the examples where a hub is used. This ability to locate other robots in the swarm or a communication hub may allow robots 105 to better coordinate with one another and better work together in a swarm.

Moreover, in some examples, the spatial triangulation ability may also allow a robot 105 to locate the source of an external or foreign sound relative to robot 105. Examples of such foreign sounds may include the sound of an intruder, the sound of an incident such as an accident or an explosion, and the like. The ability to locate themselves relative to the source of such a foreign sound may enhance the ability of robots 105 to react to or engage with the source of the foreign sound.

In addition, in some examples, the acoustic communication used by robots 105 may utilize a middle acoustic frequency range to optimize the trade-offs between noise-susceptibility, bandwidth, and power. Furthermore, in some examples, the acoustic communications may use a frequency range outside the upper frequency of the audible range of humans. Moreover, in some examples, the acoustic communications may use a frequency range outside the upper frequency of the audible range of animals present or prevalent in the environment where robots 105 operate. In some examples, the acoustic signals may have a frequency over about 15 kHz.

It is also contemplated that in some examples, one or more of robots 105 may have sensors to sense various attributes of their environment. Examples of such attributes may include fire, flooding, health and safety of places and people, and the like.

In some examples, robots 105 may be trained or retrained wirelessly. If electromagnetic communications are disrupted or not used, acoustic communications may be used to train or retrain robots 105 wirelessly. Moreover, in some examples, such retraining may take place while robots 105 are in operation or in real-time.

Furthermore, in some examples, robots 105 may be artificial intelligence (AI)-enabled. For example, some or all of the functionality of robot 105 may be guided by a trained machine learning model. In some examples, such a machine learning model may comprise a neural network. Such a machine learning model may have trainable parameters. In the context of a neural network, an example of such trainable parameters may include node weights, and the like. In some examples, training or retraining robots 105 wirelessly may comprise communicating to robots 105 the trainable parameters for their machine learning models. Communicating only the trainable parameters (as compared to communicating full operating software) may reduce the amount of data that needs to be transmitted to each robot 105, which in turn may reduce the time and communication bandwidth needed to training or retraining the robots wirelessly.

The ability to train or retrain robots 105 in operation may allow swarm 100 to perform different functions as needed. For example, the swarm may start by performing security and surveillance functions. If the swarm detects a fire emergency, one or more robots 105 of swarm 100 may then be retrained wirelessly to perform fire suppression and fire rescue assistance. In addition, the ability to receive trainable parameters wirelessly in operation may allow robots 105 to learn from one another in operation to improve the performance of individual robots 105 or the swarm as a whole.

While FIG. 1 shows robots 105 as having three microphones, it is contemplated that in some examples robots 105 may have more than three microphones. Moreover, in some examples one or more of robots 105 may have fewer than three microphones. For robots having fewer than three microphones, two or more robots may need to work together to be able to spatially triangulate the source of an incoming sound.

Figure 2:
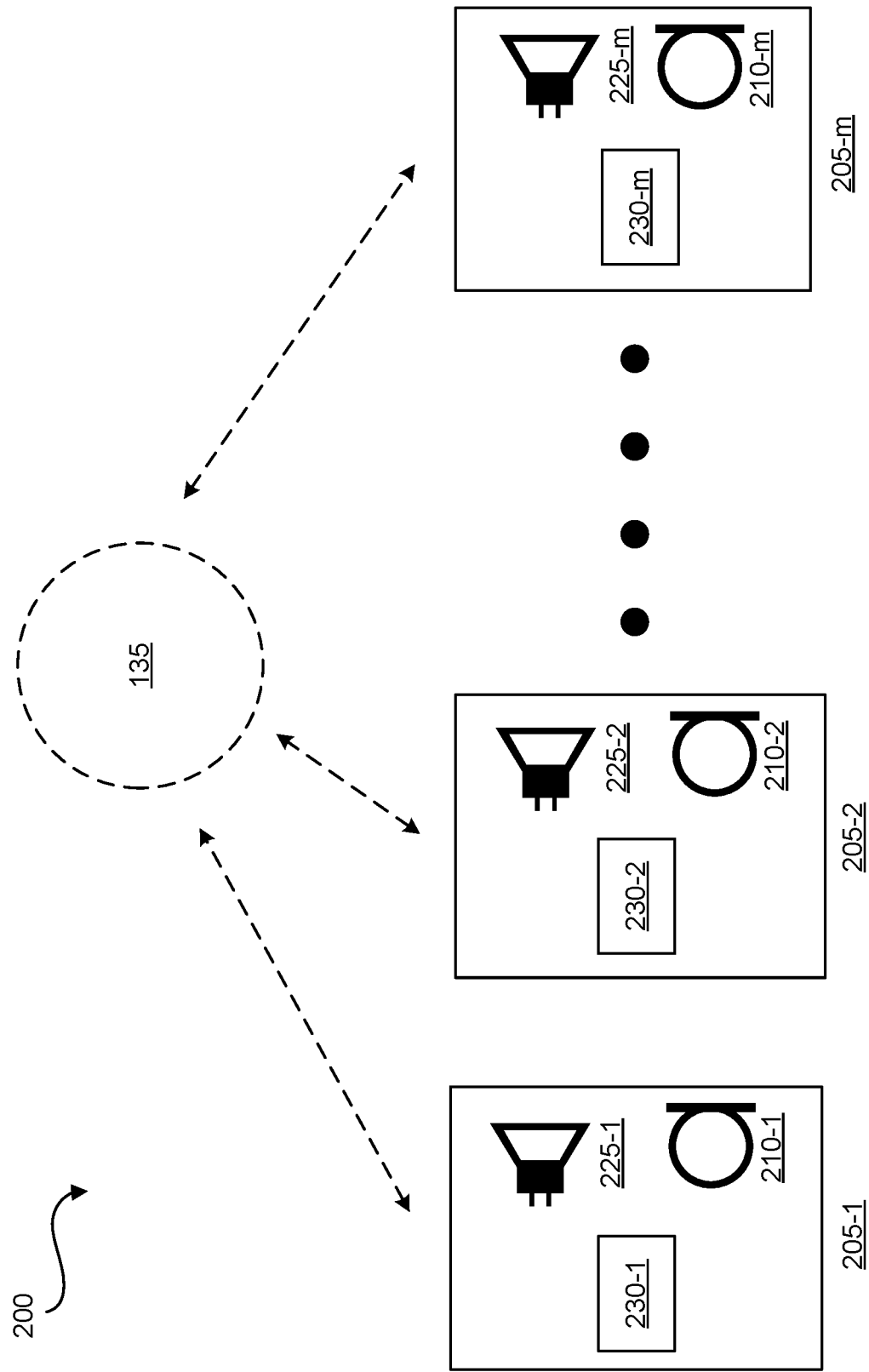
FIG. 2 shows a schematic representation of another example robot swarm, in accordance with a non-limiting implementation of the present specification.

Turning now to FIG. 2, a schematic representation is shown of another example swarm 200. Swarm 200 comprises a plurality of robots 205-1, 205-2 to 205-$m$. m may be a natural number greater than or equal to three. These robots may be generically or collectively referred to as robots 205. To address situations when their electromagnetic communications are disrupted, robots 205 may be able to switch to acoustic communications as an alternate or backup communication mode.

Robot 205-1 comprises a microphone 210-1, a speaker 225-1, and a communication terminal 230-1 for one or more of sending and receiving electromagnetic signals. Robot 205-2 comprises a microphone 210-2, a speaker 225-2, and a communication terminal 230-2 for one or more of sending and receiving electromagnetic signals. Similarly, robot 205-$m$ comprises a microphone 210-$m$, a speaker 225-$m$, and a communication terminal 230-$m$ for one or more of sending and receiving electromagnetic signals. The microphones may be generically or collectively referred to as microphones 210. Similarly, the speakers and the communication terminals may be generically or collectively referred to as speakers 225 and communication terminals 230.

Swarm 200 may be similar to swarm 100, with a difference being that swarm 200 may comprise three or more robots 205 while swarm 100 may comprise two or more robots 105. Robots 205 may be similar to robots 105, with a difference being that robots 105 each comprise three microphones while robots 205 each comprise one microphone 210. Since robots 205 each comprise one microphone 210, three or more of robots 205 may work together to spatially triangulate the location of a source of an incoming sound or acoustic signal. Aside from these differences, robots 205 may have a similar structure and function as robots 105, and swarm 200 may have characteristics or perform functions similar to those of swarm 100.

It is also contemplated that in some examples, one or more of robots 205 may have more than one microphone. In some such examples, fewer than three robots 205 may be able to work together to spatially triangulate the location of a source of an incoming sound or acoustic signal.

Figure 3:
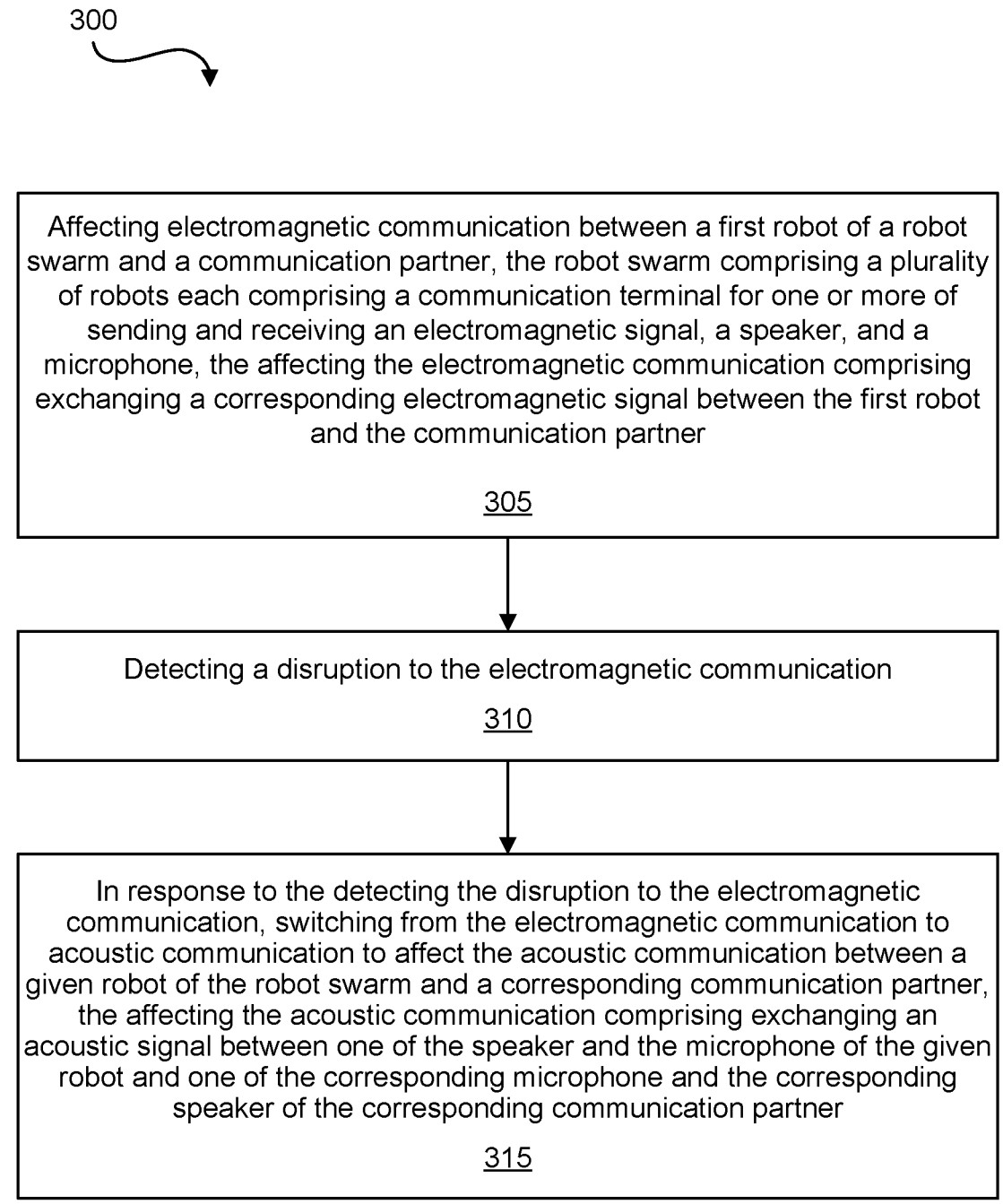
FIG. 3 shows a flowchart of an example method for operating a robot swarm, in accordance with a non-limiting implementation of the present specification.

Turning now to FIG. 3, a flowchart is shown of an example method 300 for operating a robot swarm. Method 300 may be used to operate swarm 100, 200, or another one of the swarms described herein. At box 305, electromagnetic communication may be affected between a first robot of a robot swarm and a communication partner. The robot swarm may comprise a plurality of robots each comprising a communication terminal for one or more of sending and receiving an electromagnetic signal, a speaker, and a microphone. Affecting the electromagnetic communication may comprise exchanging a corresponding electromagnetic signal between the first robot and the communication partner. In some examples, the communication partner may comprise one or more of a second robot of the robot swarm and a communication bub. Since the robots may be able to move in their environment, the electromagnetic communication may comprise wireless electromagnetic communication.

At box 310, a disruption to the electromagnetic communication may be detected. This disruption may be caused my malfunction, jamming, or the like. In some examples, the disruption may be detected by one or more robots of the swarm. Moreover, in some examples, the disruption may be detected by another entity and then communicated to one or more robots of the swarm. In some such examples, the disruption may be detected by a communication hub with which the robots of the swarm communicate or cooperate.

In some examples, detecting disruption may be passive. For example, a robot of the swarm may be designed to expect a given validation signal from a communication partner according to a predetermined schedule. If the robot fails to receive the validation signal, the robot may make a determination or detection of a disruption of electromagnetic communication. Moreover, in some examples, detecting disruption may be active. For example, a robot may be designed to send an electromagnetic signal to a communication partner to request the partner to respond by sending a validation signal. If the robot fails to receive such a validation signal or response, the robot may make a determination or detection of a disruption of electromagnetic communication. In some examples, the swarm may use passive detection, active detection, or a combination of passive and active detection.

At box 315, in response to detecting the disruption to electromagnetic communication, there may be a switch from electromagnetic communication to acoustic communication. Such acoustic communication may be affected between a given robot of the robot swarm and a corresponding communication partner. In some examples, the corresponding communication partner may comprise another robot of the robot swarm or the communication hub. Affecting the acoustic communication may comprise exchanging an acoustic signal between one of the speaker and the microphone of the given robot and one of the corresponding microphone and the corresponding speaker of the corresponding communication partner. In this manner, method 300 may be used to allow a swarm to switch to acoustic communications upon detecting a disruption to its electromagnetic communications.

In some examples, the robot or other element of the swarm that detected the disruption to electromagnetic communication may initiate the switch to acoustic communications, for example by sending or receiving an acoustic signal. Moreover, in some examples, in addition to or instead of the robot or other element of the swarm that detected the disruption to electromagnetic communication, other robots or elements of the swarm may switch to acoustic communications. In some examples, elements of a swarm may comprise robots and other entities with which the robots communicate or cooperate in operation. An example of such other entities may include a communication hub, and the like.

In addition, in some examples, one or more robots in the swarm may have relatively higher authority to made decisions regarding their own actions and the actions of some or all of the other robots in the swarm. The one or more robots with higher authority may also be described as designated robots. While portions of the following description may describe one designated robot, it is contemplated that a given swarm may have more than one designated robot. It is also contemplated that in some examples a given swarm need not have a designated robot.

The designated robot may be distinguished by possessing one or more tokens. In other words, a target robot of the robot swarm may be designated as the designated robot by associating or linking the token with the selected robot. Such a token may comprise a digital data structure or data packet. An example of such a token is described in greater detail in relation to FIG. 4. When the designated robot is to change, the token may be wirelessly communicated from the current holder of the token to the future holder which is to become the designated robot.

In some examples, determining which robot(s) in the swarm is to be the designated robot(s) may be adaptive or dynamic to the situation in which the swarm is operating. For example, a first robot in the swarm may have special capabilities or training in surveillance and security, and thus may be the designated robot of the swarm during surveillance operations. If during the surveillance operations the swarm detects a fire emergency, the token may be passed to a second robot of the swarm which may have special capabilities or training in fire suppression and fire rescue.

Moreover, in some examples, the structure or scheme of authority and decision making of the swarm may be dynamic or adaptive based on the situation in which the robots are operating. For example, in a situation of high urgency or time-sensitivity the swarm may adopt a single designated robot for relatively faster decision-making and response to the situation. Examples of such situations of high urgency may include fire emergencies, acute health emergencies, and the like. In situations of lower time-sensitivity where decision accuracy may be more important, the swarm may employ multiple designated robots or a system of checks and balances to reduce errors in decision making of the swarm. As described above, in some examples, deciding between rapid response and consensus-based or collective decision making may be based on the situation and the environment in which the swarm is operating. Examples of such situations or environmental factors may include time, place, nature of the swarm's mission or objective, and the like.

As described above, in some examples the designated robot which holds the token may decide for the swarm. Furthermore, in some examples, the robots may vote and decide based on majority, or use other approaches to making decisions collectively. For example, the robots in the swarm may use random forest voting. In some examples, this type of voting may be implemented using SKLearn™ and TensorFlow™. In some such examples, each robot in the swarm may have its own decision tree, and then use each prediction or decision of that decision tree as a vote input into an ensemble forest voting system. If there is some degree of variability or randomness among the decision trees of the members of the swarm, their collective predictions or decisions may yield an improved decision compared to individual decisions or predictions of most or all of the robots in the swarm.

It is contemplated that a range of different decision-making schemes or structures may be used by the swarms. Some examples of these decision-making scheme or structures may include monarchy, democracy, dictatorship, oligarchy, populism/demagoguery/meritocracy, and the like. In a monarchy, the swarm may have one ruler or designated robot, who passes a decision-making token down after it has been held for a period of time, to another ruler who is determined by a set of predetermined rules. These rules may include proximity, similarity of functions, and the like. While the ruler holds the token, the ruler may make decisions for the swarm independently and with little or no external review. Applications of such monarchies may include a swarm which is serving a single purpose, such as serving food or interacting with a single human. In this scenario, the swarm is used to perform external functions for the ruler, like obtaining information (scouting), retrieving objects (hunting), or performing functions (working).

In a democracy, the swarm may have one elected prime minister, who holds a decision-making token so long as regular polls of the swarm's robots indicate a preference for the holder to remain in power. Candidacy would be determined by predetermined rules, such as duration of experience with the current environment, proximity to the most critical task, and the like. Polls would elect new leaders as the swarm encounters new scenarios which demand attention, and thus the leader would tend to be chosen among the robots near the task. Applications of such a democratic system may include large and collaborative tasks which may demand immediate responses, such as putting out a fire, or reacting to an emergency. In the case that the prime minister is removed from the swarm, the next poll may elect a new prime minister based on the environment.

In a dictatorship, the swarm may have a single robot or hub where all units are controlled and all decisions are made. This may be similar to a server-controlled network, where a stationary or high-power unit is used to make decisions. In this case, this structure or scheme may be applicable to a scenario where there are multiple "servers", but many more members of the swarm. In this case, the token may be moved to the most popular (e.g. highest-connectivity) server if the original server goes down. This may require multiple tokens to be instantiated with different ranks, such that there is always a sufficient number of ranked tokens for the top token to be removed. Applications of such a dictatorial system may include a swarm which uses low-capability units in communication with a single master unit which performs the majority of the computation. This would be useful for large redundant tasks, such as cleaning many different rooms, or providing surveillance footage from multiple locations.

In an oligarchy, the swarm may have a set number of oligarchs with an odd number selected from the swarm based on predetermined rules (potentially involving first-come first serve, or random components), and voting occurs among these oligarchs. This combines some of the functions of the democracy with some of the functions of the dictatorship. Thus, there exists a voting mechanism which will not receive a tie, from which decisions for the rest of the swarm may be made. Applications of such an oligarchic system may include high-risk, immediate-response tasks, such as responding to intruders. This would be slightly different from democracy, in that there is an elevated threat to the oligarchs, but there is a benefit to direct actions on the part of the oligarch, and to the experience of the oligarch in contact with the situation at hand.

In populism, demagoguery, or meritocracy, one leader holds the token, and attempts to communicate and coordinate the actions and movements of the swarm. The leader is determined based on the robot with the highest communication bandwidth, and so the token is moved based on the capability of the units in the swarm. Further robustness may be added by having multiple ranked tokens which move based on the hierarchy of communication and decision-making. Applications of such populist, demagogic, or meritocratic systems may include a swarm where units (i.e. robots) may either degrade over time, or new units with better platforms may be added regularly, such as a mine, factory, or other high-intensity environment. As units suffer degradation, they may be demoted in the ranks, and higher-performing units may be moved to the top. The difference between populism, demagoguery, and meritocracy may be: populism involves determining the most frequent contacts, demagoguery involves determining the communications deemed most critical, and meritocracy involves a non-subjective metric like processing power or speed when handling difficult tasks.

In some examples, the existing decision-making or voting system may generate the future decision-making or voting system. This may be organic (motion suggested by a member of the swarm) or inorganic (initiated by a subroutine or meta-process).

Figure 4:
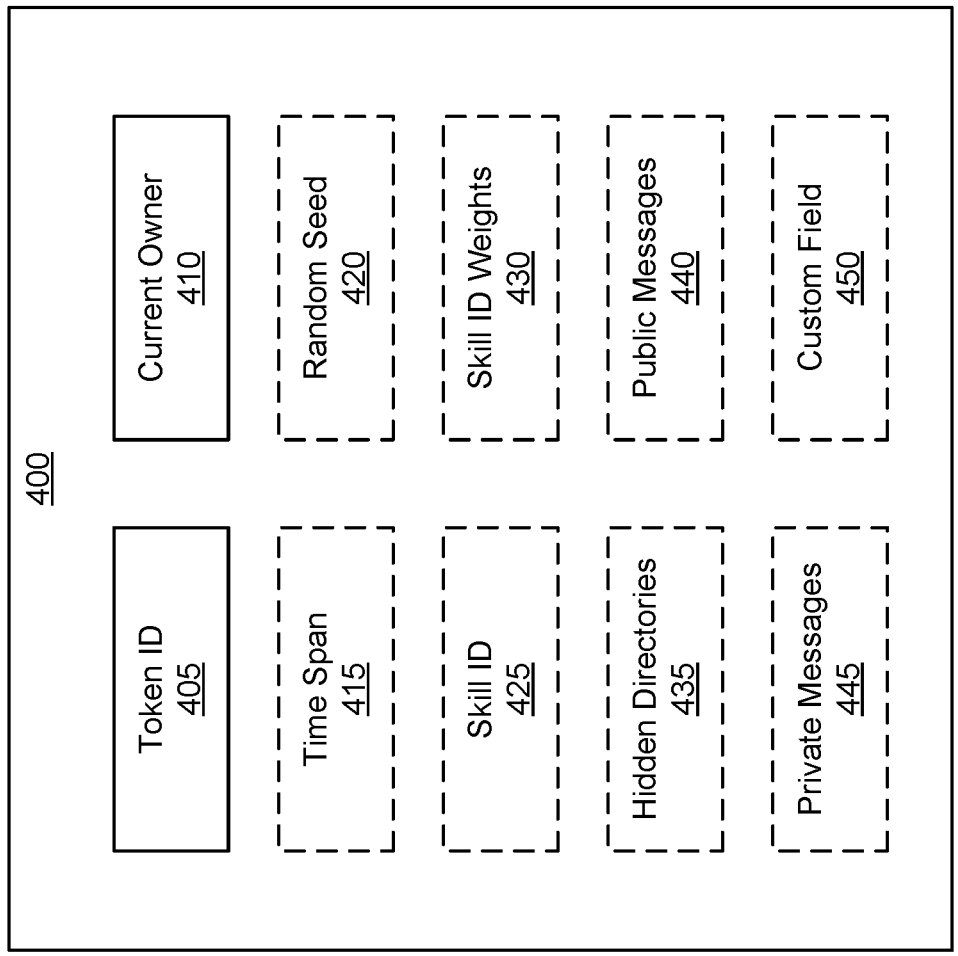
FIG. 4 shows a schematic representation of an example token for use in operating a robot swarm, in accordance with a non-limiting implementation of the present specification.

Turning now to FIG. 4, a schematic representation is shown of an example token 400. Token 400 may comprise a digital data structure or a data packet. Token 400 comprises a token ID 405, which may identify token 400. In swarms that use more than one token, the different tokens may have different token IDs. Token 400 also comprises an indication of a current owner 410 of token 400. Current owner 410 may indicate, link, or associate token 400 to the designated robot that is the holder of token 400.

Token 400 may also comprise an indication of time span 415, a random seed 420, skill ID 425, Skill ID weight 430, hidden directories 435, public messages 440, private messages 445, and a custom field 450. In FIG. 4 these entities are shown in dashed lines to indicate that in some examples token 400 need not comprise one or more of, or all of, these entities. In some examples, time span 415 may indicate the amount of time the current designated robot has had token 400, or a time span upon the completion of which the designated robot is to pass on token 400 to another robot of the swarm.

Random seed 420 may be used to introduce some degree of randomness to the functioning of the designated robot having the token. If the designated robot is deciding or controlling some of all of the functions of some or all of the other robots in the swarm, random seed 420 may also impart some degree of randomness to the functioning of some or all of the members of the swarm via the designated robot.

As discussed above, in some examples random seed 420 may be used to impart a small difference to the decision, prediction, or classification engine of a robot. These small differences may then allow for improved collective decisions of the swarm that are based on aggregates of decisions of robots in the swarm. Moreover, random seed 420 may be used to impart a degree of randomness and unpredictability to the behavior of the swarm. In applications or situations where the swarm is guarding against or responding to an adversary, such relatively less predictable behaviour may make it more difficult for the adversary to circumvent or neutralize the swarm.

Having the partly-randomized actions of a robot or the swarm being based on random seed 420 may allow for some additional functionality. One example of this additional functionality may be the ability to authenticate that a new robot seeking to join the swarm is a legitimate addition to the swarm. The legitimacy of the new member may be confirmed or authenticated by checking or authenticating random seed 420.

Moreover, in some examples, random seed 420 may allow for the past actions of a robot to be retraced. If the random seed is known and the robot's decision-making engine is known, then knowing the seed setting the initial parameters may allow for reconstructing the robot's actions and decisions. This approach may be more efficient than a robot recording all of its actions. Such a recording may use power and memory, and communicating such a full record may be bandwidth-intensive. The ability to reconstruct the robot's actions based on the random seed may provide an approach to logging or tracking a robot's actions, which approach may use less power, less memory, and less communication bandwidth than the robot recording each one of its actions.

Furthermore, in some examples, a record of robot IDs associated with corresponding random seeds may be maintained for a swarm. Such a record may be maintained by one or more robot members of the swarm, or by other entities associated with the swarm such a communication hub, a control unit, and the like. In addition, such a record may act as a master list to authenticate legitimate robot members of the swarm, and as a way of retracing or logging the actions of the robots of the swarm, as discussed above.

Token 400 may also comprise Skill ID 425 and Skill ID Weights 430. These parameters may relate to weights or other trainable parameters of a machine learning model controlling or guiding the actions of one or more robots of the swarm. Skill ID 425 and Skill ID Weights 430 may be used to train or retrain one or more robots of the swarm. In some examples, this training or retraining may take place in operation or in real time. In addition, Skill ID 425 and Skill ID Weights 430 may allow for transfer learning among the robots of a swarm. In some examples, transfer learning may be used to send, in a short amount of time such as a few milliseconds, a small tweak to some layers of the decision engine of a robot that may allow that robot to detect age, gender, stress level, intoxication level, and the like. When the need for this functionality no longer exists, the robot may be reprogrammed again or returned to its default settings.

Hidden directories 435 may refer to directories or information that is hidden or not easily accessible. Public messages 440 may reflect or store messages sent, or to be sent, to some or all of the other robots in the swarm. An example of such a public message may include "Everything is OK, continue as normal". Private messages 445 may reflect or store messages to one or a few other robots; for example; a first robot soliciting a second robot for cooperation and sharing computing resources to accomplish a large computing task.

Custom field 450 may comprise a configurable field for dynamically-defined or user-defined parameters. For example, custom field 450 may be used to store or indicate custom rules or messages, such as a client or corporate calendar to inform how and when the swarm should operate to optimally serve the client. Moreover, in some examples, custom field 450 may store custom privacy settings, such as an indication not to record video in interior spaces of a client premises.

The swarms described herein may exhibit a variety of behaviors based on the situations in which they operate and their objectives. In some examples, some or all robots in a swarm may hide in response to an external stimulus or threat. For example, in response to detecting an intruder, some members of a swarm of security or surveillance robots may hide. In some examples, the robots may hide near a heat source to mask the hiding robots' heat signature. Examples of such heat sources may include furnaces, water heaters, ridges or coolers, and the like. Furthermore, in some examples, the hiding behavior may be applicable when there is a threat to the robot swarm or to general security; hiding may not apply in other situations that need quick response or engagement by the robots, such as fire, flooding, medical emergencies, and the like.

In addition, in some examples, the swarm may choose and send one or more scouts to investigate an incident or a stimulus. The remaining members of the swarm may hide or perform other functions. The findings of the scouts may then inform the subsequent actions of the other members of the swarm. In situations where the incident or stimulus may be harmful to the robots, sending a few scouts may reduce the likelihood of damage to a large number of the robots while still allowing at least one or more members of the swarm to investigate the incident. Moreover, in some examples, one or more members of the swarm may use their speakers to play or project audible warnings, instructions, or informational messages such as evacuation notices. Two or more robots may work together to control or adjust the spatial projection of the audio signals or messages, to tailor the effect produced by those messages.

Furthermore, the robots may also use their microphones to detect incidents or intruders. For example, the robots may listen for sounds from people trapped in a building collapse or by another incident or disaster. In security and surveillance operations, the robots may also listen for sounds to detect intrusions.

It is also contemplated that the swarms described herein may have features or perform functions other than those described herein. As the robots in the swarm may be trainable or retrainable, in operation and in real time, the robots may be trained or retrained for different functions based on the situations in which they operate.

It should be recognized that features and aspects of the various examples provided herein may be combined into further examples that also fall within the scope of the present disclosure.

The invention claimed is:

1. A robot swarm comprising:
   two or more robots, each robot comprising:
   three or more microphones;
   a speaker; and
   a communication terminal for one or more of sending and receiving an electromagnetic signal to or from a communication partner to affect electromagnetic communication with the communication partner;

upon detection of a disruption to the electromagnetic communication, a given robot of the two or more robots to switch from electromagnetic communication to acoustic communication by exchanging an acoustic signal between one of the speaker and at least one of the microphones of the given robot and one of a corresponding microphone and a corresponding speaker of a corresponding communication partner.

2. The robot swarm of claim 1, wherein one or more of:
the communication partner comprises one or more of: a robot of the two or more robots and a communication hub; and
the corresponding communication partner comprises one or more of: a corresponding robot of the two or more robots and the communication hub.

3. The robot swarm of claim 2, wherein the communication hub is fixed in space.

4. The robot swarm of claim 2, wherein the communication hub is mobile.

5. The robot swarm of claim 4, wherein the communication hub comprises one of the two or more robots.

6. The robot swarm of claim 1, wherein the electromagnetic signal comprises a wireless signal.

7. The robot swarm of claim 1, wherein the acoustic signal has a frequency range outside the upper frequency of the audible range of one or more of humans and animals.

8. The robot swarm of claim 7, wherein the frequency range of the acoustic signal is over about 15 kHz.

9. A robot swarm comprising:
three or more robots, each robot comprising:
a microphone;
a speaker; and
a communication terminal for one or more of sending and receiving an electromagnetic signal to or from a communication partner to affect electromagnetic communication with the communication partner;
upon detection of a disruption to the electromagnetic communication, a given robot of the three or more robots to switch from electromagnetic communication to acoustic communication by exchanging an acoustic signal between one of the speaker and the microphone of the given robot and one of a corresponding microphone and a corresponding speaker of a corresponding communication partner.

10. The robot swarm of claim 9, wherein one or more of:
the communication partner comprises one or more of: a robot of the three or more robots and a communication hub; and
the corresponding communication partner comprises one or more of: a corresponding robot of the two or more robots and the communication hub.

11. The robot swarm of claim 10, wherein the communication hub is fixed in space.

12. The robot swarm of claim 10, wherein the communication hub is mobile.

13. The robot swarm of claim 12, wherein the communication hub comprises one of the two or more robots.

14. The robot swarm of claim 9, wherein the electromagnetic signal comprises a wireless signal.

15. The robot swarm of claim 9, wherein the acoustic signal has a frequency range outside the upper frequency of the audible range of one or more of humans and animals.

16. The robot swarm of claim 15, wherein the frequency range of the acoustic signal is over about 15 kHz.

17. A method of operating a robot swarm, the method comprising:
affecting electromagnetic communication between a first robot of the robot swarm and a communication partner, the robot swarm comprising a plurality of robots each comprising a communication terminal for one or more of sending and receiving an electromagnetic signal, a speaker, and a microphone, the affecting the electromagnetic communication comprising exchanging a corresponding electromagnetic signal between the first robot and the communication partner;
detecting a disruption to the electromagnetic communication; and
in response to the detecting the disruption to the electromagnetic communication, switching from the electromagnetic communication to acoustic communication to affect the acoustic communication between a given robot of the robot swarm and a corresponding communication partner, the affecting the acoustic communication comprising exchanging an acoustic signal between one of the speaker and the microphone of the given robot and one of a corresponding microphone and a corresponding speaker of the corresponding communication partner.

18. The method of claim 17, wherein one or more of:
the exchanging the corresponding electromagnetic signal between the first robot and the communication partner comprises exchanging the corresponding electromagnetic signal between the first robot and the communication partner comprising one or more of a second robot of the robot swarm and a communication bub; and
the exchanging the acoustic signal between one of the speaker and the microphone of the given robot and one of the corresponding microphone and the corresponding speaker of the corresponding communication partner comprises exchanging the acoustic signal between one of the speaker and the microphone of the given robot and one of the corresponding microphone and the corresponding speaker of the corresponding communication partner comprising one or more of another robot of the robot swarm and the communication hub.

19. The method of claim 17, wherein the exchanging the corresponding electromagnetic signal between the first robot and the communication partner comprises exchanging a wireless electromagnetic signal between the first robot and the communication partner.

20. The method of claim 17, further comprising:
designating a target robot of the plurality of robots as a designated robot by associating a token with the target robot, the token comprising a digital data structure.

21. The method of claim 20, wherein the token comprises a token ID and an indication of a current owner of the token to associate the token with the designated robot.

22. The method of claim 21, wherein the token further comprises one or more of: an indication of time span, a random seed, a skill ID, a Skill ID weight, one or more hidden directories, one or more public messages, one or more private messages, and a custom field.

23. The method of claim 22, further comprising:
at least partially randomizing one or more functions of the designated robot based on the random seed.

24. The method of claim 20, further comprising:
changing the designated robot by wirelessly communicating the token from the designated robot to another robot of the robot swarm.

25. The method of claim 20, wherein the designating the target robot of the plurality of robots as the designated robot comprises determining the one of the plurality of robots based on a situation in which the robot swarm is to operate.

* * * * *